L. HAMMER.
LIQUID CHANGE SPEED GEAR FOR AUTOMOBILES.
APPLICATION FILED JUNE 26, 1913.
1,074,096.  Patented Sept. 23, 1913.
8 SHEETS—SHEET 2.
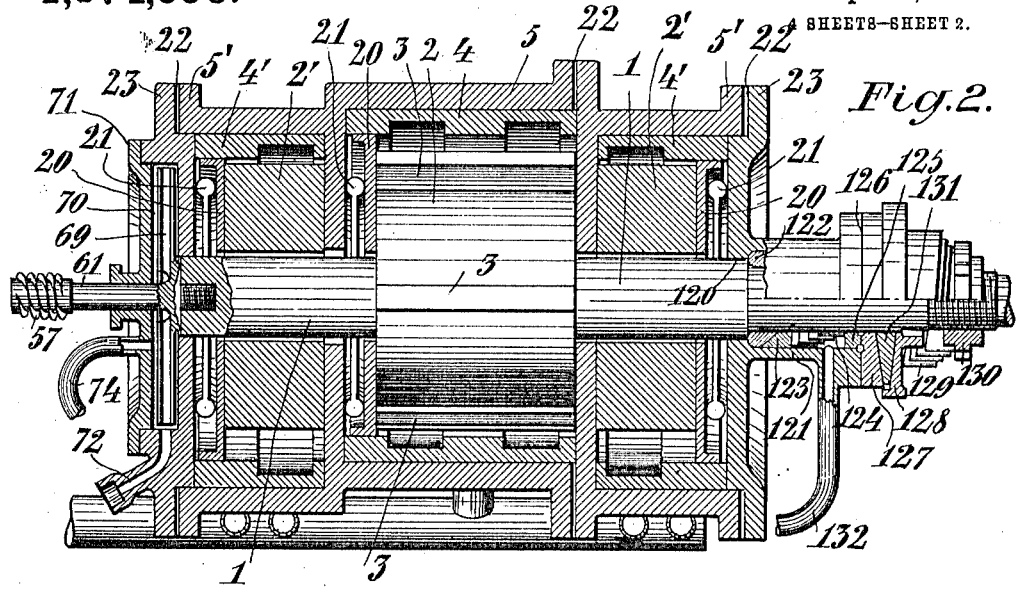
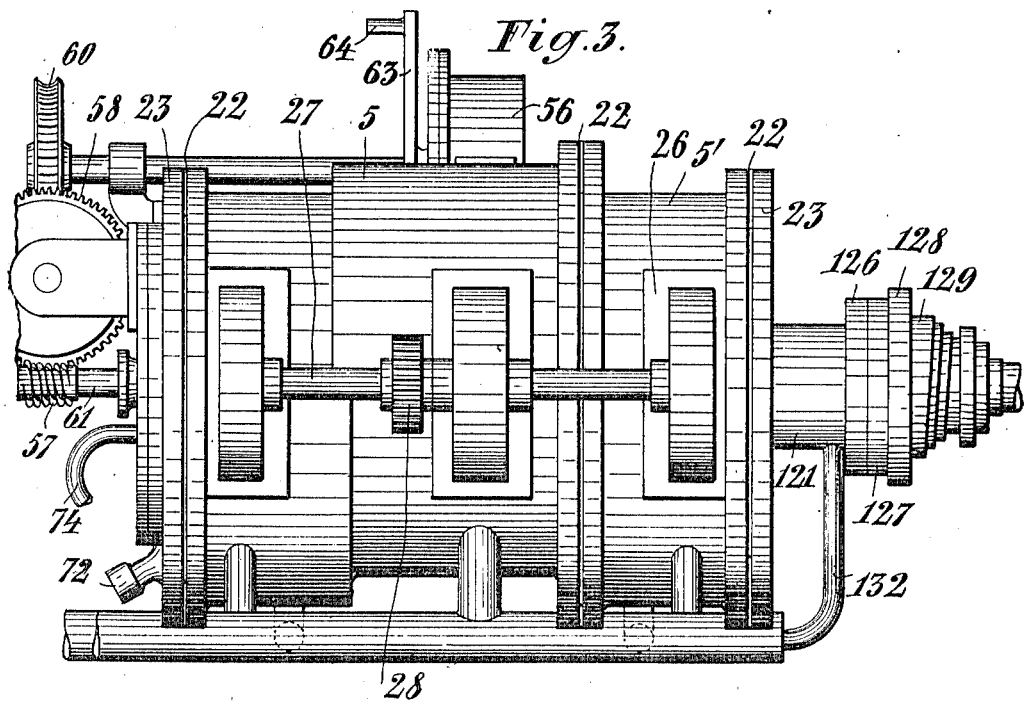
Witnesses:—
Charles B Brompton
Fred Pohl
L. Hammer.
Inventor.
By J. Croydon Marks
Attorney.

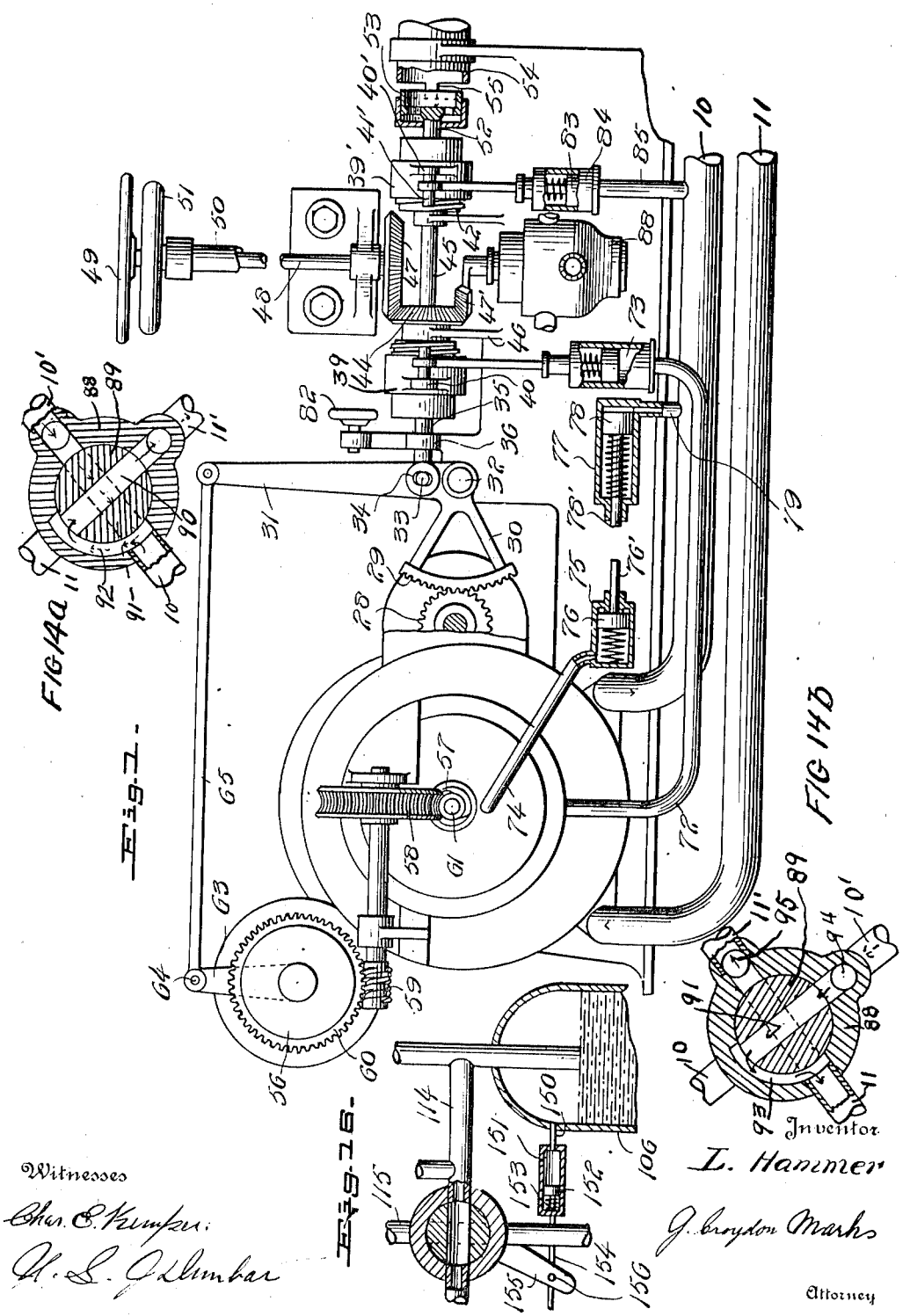

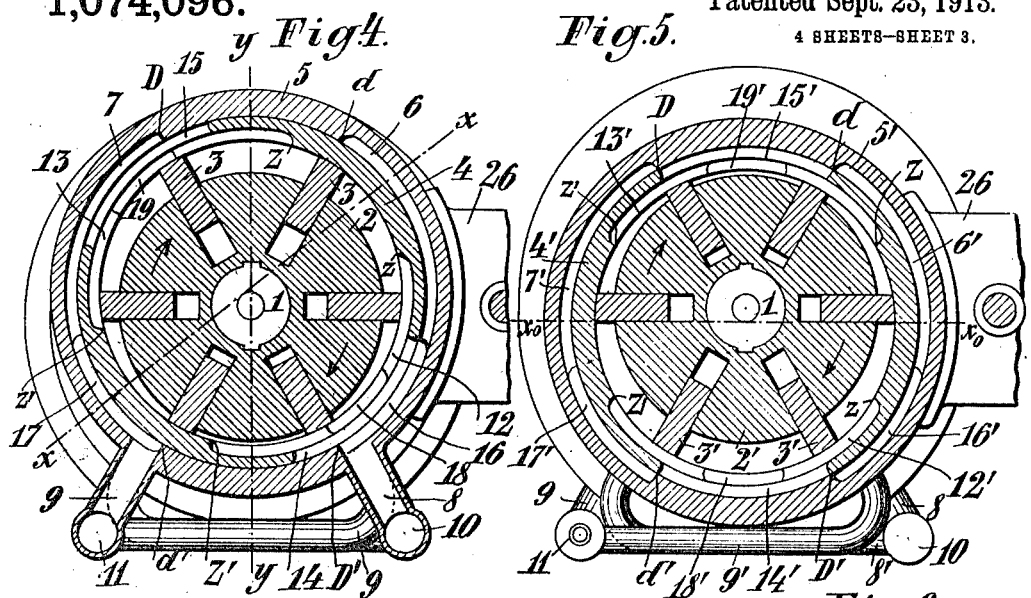

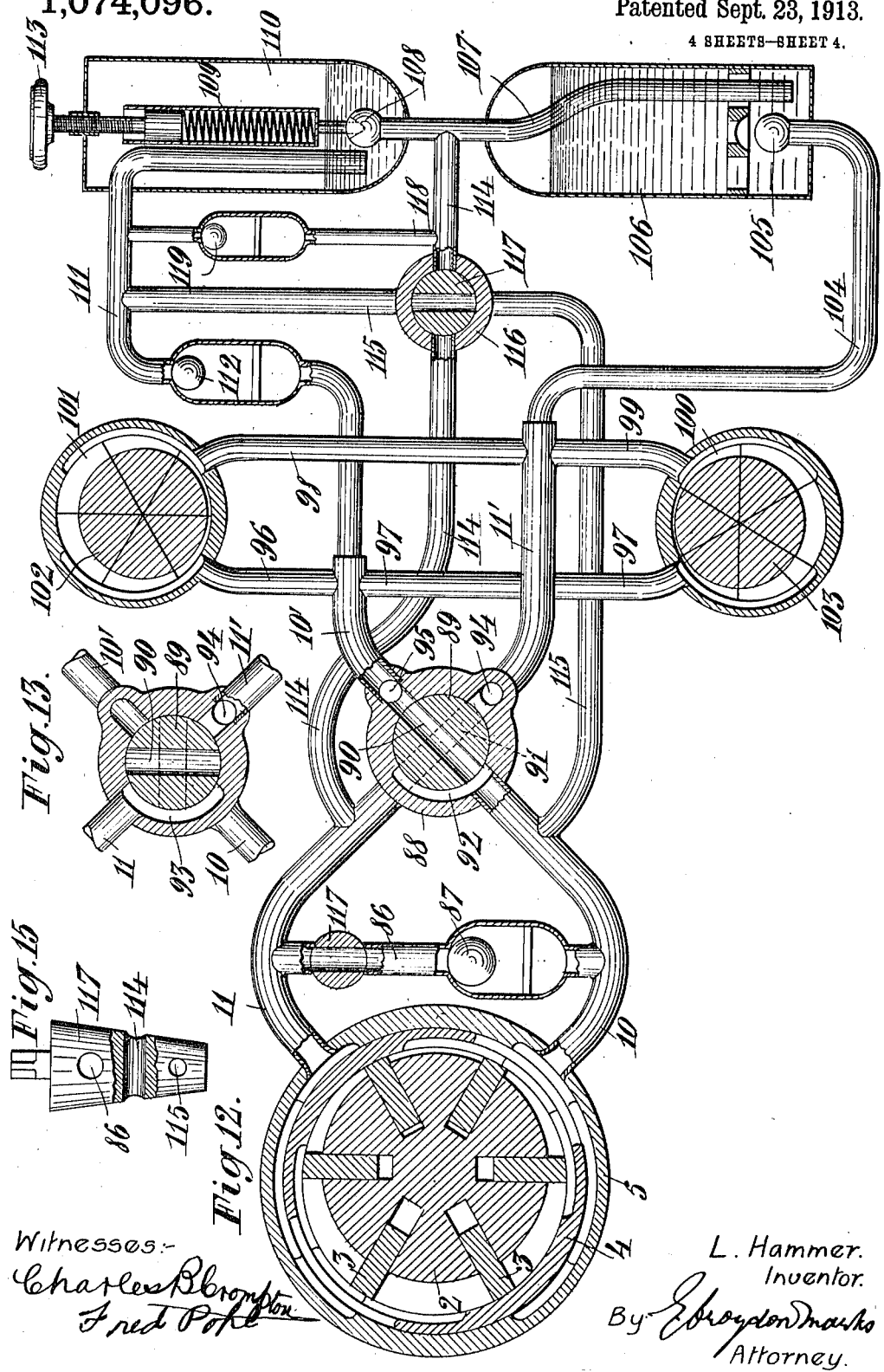

UNITED STATES PATENT OFFICE.

LUDWIG HAMMER, OF VIENNA, AUSTRIA-HUNGARY.

LIQUID CHANGE-SPEED GEAR FOR AUTOMOBILES.

1,074,096.  Specification of Letters Patent.  Patented Sept. 23, 1913.

Application filed June 26, 1913. Serial No. 775,911.

*To all whom it may concern:*

Be it known that I, LUDWIG HAMMER, a subject of the Emperor of Austria-Hungary, and residing at 11 Leidesdorfergasse, Vienna XIX, Austria-Hungary, have invented certain new and useful Improvements in Liquid Change-Speed Gears for Automobiles, of which the following is a specification.

This invention relates to hydraulic change speed gears for automobile and power vehicles of all kinds, and has for object improvements therein by means of which there can be obtained an infinitely variable velocity ratio between the main engine and the driven motors, coasting and reversal of the latter, hydraulic braking and storage of the braked energy for the purpose of starting the engine, and the automatic regulation of the speed of revolution, of the air, fuel and oil supply at any instant, of the maximum hydraulic pressure, of the maximum speed of the vehicle, and of the most favorable velocity ratio at any instant.

The invention consists substantially in an improved hydraulic change speed gear system in which by means of a hydraulic primary pump of special design driven by the engine, an infinitely variable velocity ratio between the driving engine and the driven wheel motors is obtained, while at the same time members positively controlling the air, fuel and oil supply, are actuated in such manner that the amount of air, fuel and oil delivered corresponds to the power requirements at any instant, this amount being also automatically varied by a hydraulic piston acted upon by the instantaneous pressure in the primary pump when this pressure rises above a permissible value, the speed of revolution of the main engine being thereby governed.

Figure 1 is a general elevation of the engine with the regulating devices. Figs. 2, 3, 4, 5 show in section and in elevation the hydraulic pump which constitutes the basis of the entire change speed gear. Figs. 6, 7, 8, 9, 10, 11, 13, 14$a$, 14$b$, 15 and 16 show details. Fig. 12 shows the pipe system with its connections and cocks provided between the driving pump and the driven wheel motors.

The shaft 1 of the gear is driven by any suitable prime mover. On this shaft 1 are keyed or otherwise fixed three drums 2, 2' and 2', in radial slots of which pistons 3 can work to-and-fro fluid-tight. The volume of each of the two side drums 2', 2' is exactly half the volume of the middle drum 2. In the present example all three drums have equal diameters, but the length of each of the two side drums is exactly half that of the middle drum. These drums 2', 2, 2' are surrounded by larger guide cylinders 4', 4, 4' arranged eccentrically to the drums, but in such a manner that the eccentricity of the middle guide cylinder 4 is exactly opposite, *i. e.* shifted 180° relatively to the eccentricity of the two side cylinders 4', 4', and these guide cylinders are fitted tight in the outer casings 5', 5, 5', in which they can be rotated by any suitable means.

The outer casings (Fig. 4) have each two zones D—$d$, D'—$d'$ located opposite to each other, between which on the inner side, the connecting ducts 6 and 7 extend to the delivery pipes 8, 8', 8', and suction pipes 9, 9', 9', respectively, connected to the outer casing. The delivery pipes 8, 8', 8' are led to a common delivery duct 10, and the suction pipes 9, 9', 9' are led to a suction duct 11. Similarly the guiding or distributing cylinders 4, 4', 4' have each two oppositely located zones Z—$z$, Z'—$z'$, between which likewise on the inner side there are connecting ducts 12 and 13 from which the liquid can pass through ports 14, 15, into the corresponding ducts 6 and 7 of the outer casing.

When, for constructional reasons, it is necessary to employ a plurality of juxtaposed connecting ducts 6, 7 and 12, 13 then these are connected to one another by means of transverse ducts 16, 17 and 18, 19.

The end of each of the cylinders 4', 4, 4', is closed liquid-tight by means of a plate cover 20 (Fig. 2) fitting closely in the bore of the inner casing and being pressed against the end of the drums 2', 2 and 2' by annular springs 21, consisting of a spring tube split longitudinally and bent into a circle, or by any other elastic members. This arrangement enables the joints 22 between the parts of the casing to be tightened up sufficiently to prevent leakage without jamming the rotary parts.

The movement of the guide cylinder may be effected for instance by the engagement of a toothed wheel 24 (Fig. 6) in a ring of teeth 25 cut in the outside wall of the distributing cylinder 4, 4'. The casings 26 of the toothed wheels 24 are arranged as shown in Fig. 3 so that it is possible to drive by means of a single shaft 27 all the toothed wheels 24. These gear wheels 24 must be all of the same size in order that the angular rotary movements of the distributing cylinders 4', 4, 4' may be all equal.

The shaft 27 carries a toothed wheel 28 in which gears a toothed segment 29 (Fig. 1) mounted on a bell crank lever 30, 31, pivoted on a pin 32. The arm 31 of this bell crank lever is provided with a pin 33 fixed as close to 32 as possible and embraced by a ring 34 having an elongated hole.

The ring 34 forms the end of a rod 35 which can be moved axially through a bearing 36. The rod 35 carries at its other end a collar 37 engaging in a collar bearing 38 of a nut 39, (Fig. 10) which nut is provided with a lever 40 with pin 41, 42 is a screw fitting the nut 39. The screw 42 is mounted by means of a short rod 43 and a bevel wheel 44 on a long pin 45. The part 43 is mounted in a collar bearing 46. A larger bevel wheel 47 meshes with the bevel wheel 44; it is fixed directly to the axle 48 of the regulating wheel 49. The axle 48 of the wheel 49 extends through the hollow axle 50 of the steering wheel 51 of the vehicle.

In order to regulate the supply of fuel and oil according to the power consumption, the long pin 45 is provided at its other end likewise with a collar similar to the collar 37 of the pin 35 and the arrangement of nut 39, lever 40, pin 41, and screw 42, is repeated at 39', 40', 41', and 42'. 52 is a rod extending through collar bearings into the nut 39'; it is provided at its end with a hollow piston 53. This hollow piston fits into the tube 54 which serves for the air supply and which is closed at its end facing the nut 39'. This tube 54 is formed with slots 55 at the place where the piston 53 is situated when the engine is at rest.

For the supply of fuel, lubricating oil, and water, another pump group is provided which is connected to the driving shaft 1, (and is therefore driven from the main engine) by suitable mechanism, for instance through a worm gearing 57, 58, 59, 60 and the axle 61. Fig. 11 is a cross section of a pump group of this kind.

In the casing 56 there is provided a distributing cylinder 62 similar to the cylinder 4 of the main engine which is connected by a lever, 63, pin 64, and a connecting arm 65, (Fig. 1) to the bell crank lever 31, of the main engine. 66, 67 68 are respectively the driving shaft, drum and sliding piston.

Since it is of great economical importance that the speed of revolution shall be maintained as nearly as possible at the value which happens to be most favorable for the engine, there is arranged a speed governor which acts automatically to regulate the fuel supply. For this purpose the speed regulating apparatus shown in section in Fig. 8, is fixed to the free end of the engine shaft 1 projecting from the casing cover 23. This apparatus consists of a disk 69, provided with radial holes or passages, and which rotates in the space 70 between the casing cover 23 and the tight-fitting cover 71 at the same speed as the engine. The space 70 (Fig. 2) is filled with a determined quantity of oil and mercury. During the rotation the oil collects around the axis of rotation, while the specifically heavier mercury is thrown outward against the periphery of the said space where it exerts a centrifugal pressure depending on the speed of rotation at any instant. This pressure is communicated through a pipe 72 to the cylinder whose piston 73, (Fig. 1) acts (in opposition to the action of a spring) upon the lever 40 which is pivoted to it and thus actuates the controlling casing 4', 4, 4', that is to say, controls the speed ratio.

The control is so arranged that the supply is reduced when the speed of revolution rises above the mean value and vice versa. Near the center of the space 70 the pipe 74 branches off to a piston cylinder 75 whose piston rod 76' projects freely from the cylinder. Opposite this cylinder 75 and in reversed position is a similar cylinder 77 having a freely projecting piston rod 78' whose piston 78 is pressed by a spring against the end of the cylinder which is connected by a pipe 79 to the pressure pipe 10.

If the liquid pressure in the gear rises above a determined value, the pressure of the spring of the piston 78 in the cylinder 77 is overcome to such a degree that the piston rod 78' encounters the piston rod 76' and forces the piston 76 into the cylinder 75. The oil in the cylinder 75 is thereby forced through the pipe 74 into the casing 70 and thus forces the rotating annulus of mercury still more against the periphery of the casing 70 so that the centrifugal pressure is thereby increased which increase causes in the same manner as the previously described increase of speed, a decrease in the supply of fuel, and consequently diminishes the power of the driving engine.

In Fig. 8, the full line circle 80 denotes the inner edge of the mercury annulus under normal pressure conditions, and the chain-dotted line 81 indicates the said edge when the pressure regulator is in action.

As shown by way of example in Fig. 1, by means of an adjusting screw 82 which can be clamped up or sealed if necessary, the stroke of the lever 31 and thereby the maximum angular movement of the casing 4', 4 or 4' (Figs. 4 and 5) may be limited, thus limiting the maximum speed of the vehicle.

If a hydraulic machine is to remain permanently fluid-tight, the working pressure must not exceed a certain permissible value. For this reason, means are provided for controlling the pressure in the apparatus. These means consist of a piston 83 which works in opposition to a spring in a cylinder communicating through a pipe 85 with the pressure pipe 10 of the apparatus. The piston 83 acts through its rod upon the pin 41' and the lever 40 of the nut 39' which actuates the pin 52 and the piston 53 and controls the air or gas supply.

The main pressure and suction pipes 10 and 11 are connected to each other behind the hydraulic apparatus by means of a connecting pipe 86 (Fig. 12) in which a valve 87 is included which can close only against the suction pipe 11. Behind this connecting pipe the two main pipes cross each other in two different planes in a reversing cock 88 which can also, but need not necessarily, act at the same time as a throttling cock. This cock is shown in longitudinal section in Fig. 9 from which it will be perceived that the plug 89 has a bore 90 and underneath at right angles to the upper one, a bore 91, and is connected by means of a toothed segment 47' (Fig. 1) and the bevel wheels 44 and 47 to the regulating wheel 49. The cock casing 88 is formed at the inlet of each of the pipes 10 and 11 with a quadrant port 92, 93 (Fig. 12) and at the outlet of the pipes 10' and 11' with vertical branches 94, 95. Pipes 96, 97 and 98, 99 respectively branch off on two or more sides from the pipes 10' and 11' (issuing from the reversing cock) and lead to the wheel motors 100 and 101 whose drums 102, 103 are connected either to the driving wheels of the vehicle, or to other propelling devices.

A pipe 104 closed by a valve 105 leads from the suction pipe 11' into a high pressure vessel 106, and from the latter there leads a pipe 107 into a second vessel 110 in which the pressure is usually lower. From the vessel 110 a pipe 111 leads through a non-return valve 112 back to the delivery pipe 10'. The pipe 107 that connects the two vessels together, is closed by a non-return valve 108 which is pressed upon its seat by a spring 109. The tension of the spring 109 can be varied within limits by means of a screw 113.

A pipe 114 leads from the vessel 106 or pipe 107 into the suction pipe 11 of the machine between the connecting pipe 86 and the reversing cock 88. A pipe 115 leads from the vessel 110 or pipe 111 into the delivery pipe 10 of the machine between the connecting pipe 86 and the reversing cock 88. These two pipes 114 and 115 and the connecting pipe 86 cross one another in three different planes through a cock 116 the plug 117 of which is shown in Fig. 15. Between the vessels 106 and 110 and the cock 116 there is also provided a connecting pipe 118 in which a non-return valve 119 is fitted.

It is very important for the reliable operation of a hydraulic gear that the driving shaft shall be securely packed at its passage through the cover of the machine. A construction which fulfils this condition is shown in Fig. 2.

The shaft 1 is led as fluid-tight as possible at 120 through the cover 23. Behind this, the shaft 1 is contracted. The cover 23 is constructed in the form of an enlarged stuffing box 121. The bearing 120 is provided with an elastic packing 122 which is pressed against it by a wedge-shaped ring 123 by means of a spring 124 bearing against the ring 125.

127 is a packing ring which is placed against the flat end 126 of the stuffing box 121 and the bearing ring 125. The ring 127 rotates with the shaft 1 and is pressed upon its seat by a spring 129 through the medium of a disk 128. The tension of the spring 129 can be regulated by the screw nut 130. Between the packing ring 127 and the disk 128 there is a ring of elastic packing 131 which bears tightly against the shaft 1'. A small pipe 132 leads from the stuffing box 121, to the suction pipe 11 of the machine. This packing arrangement operates as follows: Any oil leaking from the machine is stopped for the most part by the packing 122. Any oil that still leaks through can only do so either through the junction 126 or between the shaft and the packing 131. The packing at 120 or 126 can however be so well carried out as to render it impossible for fluid to escape through them, the more so since the small pressure existing in the stuffing box 121 owing to its connection through the pipe 132 with the suction pipe of the machine renders this path an easier one for leakage. From the stuffing box 121 any oil is returned into the machine through the pipe 132.

The operation of the whole gear is as follows:—As soon as the shaft 1 is driven by any prime mover, a benzine motor or a steam engine &c., the radial pistons 3 will begin to circulate liquid through the gearing apparatus. This circulation will be from the pipe 11 into the pipe, 10, if, as shown in Figs. 4 and 5, the rotation is in a clockwise direction. In Fig. 4 the zone $z$—$z$ of the cylinders 4', 4 or 4' is shown situated in a position $x$—$x$ about 45° from the axis of eccentricity $y$—$y$ and therefore each piston delivers to the delivery side a quantity of liquid which is determined by the size of the segment located against or adjacent to the zone $z$—$z$ between the drums 2', 2, 2', and the cylinders 4', 4, 4', while a quantity of liquid corresponding to the oppositely located segments is conveyed from the delivery side back to the suction side. Consequently the difference between the cylinder segments lying against or adjacent to the jointing zones $z$—$z$ and $z'$—$z'$ is conveyed from the suction pipe to the delivery pipe. If now by rotating the cylinders 4', 4, 4', the zone $z$—$z$, is brought at right angles to the axis of eccentricity, that is to say, into the position $x_0$—$x_0$ in Fig. 5, then the cylinder segments located opposite to each other are equal to each other, and therefore as much liquid is conveyed through the pump to the delivery side as there is liquid conveyed from the delivery side to the suction side. The result is therefore that there is no delivery of liquid at all from the suction pipe into the delivery pipe. The eccentricity of the piston system relatively to the cylinder and the outer casing meanwhile remains constant. If the axis $x$—$x$ is rotated still farther beyond the neutral axis $x_0$—$x_0$ a flow of liquid again takes place in the same direction as before.

The division of the machine into a middle cylinder of a volume equal to the sum of the volumes of the two side cylinders, the eccentricities of the side cylinders being directed oppositely to the eccentricity of the middle cylinder, has the object of counterbalancing the pressure of the working liquid upon the shaft 1 and its bearings, for all velocity ratios.

In the rest position of the machine, the cock 89 (Fig. 12) is in its middle position as shown in Fig. 13. The pipes are shut so that the wheels of the vehicle are held fast, that is to say, are braked hard. At the same time the cylinders 4', 4, 4' of the machine are in the neutral position $x_0$—$x_0$, and the piston 53 of the gas supply pipe closes the slot 55 of the pipe 54. The electric contacts for the ignition are also broken. The cock 117 is now turned so that the pipes 114 and 115 are opened and thus the connecting pipe 86 is closed. From the vessel 106 containing working liquid under high pressure, liquid can now flow through the pipes 107, 114 and 11 into the pump. Then by means of the hand wheel 49 and the transmission devices 48, 47, 44, 42, 39, 35, 30, 28, the cylinder 4', 4, 4' is moved out of its mid-position and at the same time the cock 89 is opened by the toothed segment 47', while by means of the parts 45, 42', 39', 52, the piston 53 is moved until it opens the gas supply and closes the electric contact for the ignition. When this has been done, liquid flows from the vessel 106 into the pump and from the latter through the pipes 10, 115, 111, into the vessel 110, whereby the main pump is rotated and the driving engine is started, and the cock 117 must now be turned so that the pipes 114 and 115 are closed, that is, the pipe 86 can be opened again. If this is n done, then liquid will flow from the vessel 106 through the pump into the vessel 110 until equal pressures exist in both vessels, and as the eccentricity of the main pump is increased, the valve 119 will open and the liquid will pass through the pipe 118 back into the pump without operating the wheel motors. In order to prevent this the cock 117 may be closed automatically by a device which operates when there is approximately the same pressure in both vessels. Such an apparatus is shown in Fig. 16. In this figure a pipe 150 is shown leading from the tank 106 to a cylinder 151 in which piston 152 because of the pressure in the tank is forced back against the action of the spring 153. The piston 152 carries a connecting rod 154 which is attached to lever 155 which is adapted to close or open the cock 117, at 156. It will be seen that with a reduction of the pressure in tank 106 the spring 153 will force the piston forwardly thus closing the pipes 114 and 115 and opening the pipe 86. As soon as the cock 117 is closed, the liquid pressure generated by the pump acts upon the wheel motors and the latter commence to move in the direction of travel, and the more quickly the more the axis $x$—$x$ of the cylinders 4', 4, 4', approaches the eccentricity axis $y$—$y$ of the casing. In the same manner by means of the connection of the air governor 53 to the pin 45 and of the lever 63 of the fuel oil and cooling water pumps 56 to the lever 65, 31 and 30, the supply of air, lubricating oil and cooling water are regulated according to the varying power consumption.

If the resistance to the machine should diminish, for instance owing to the fact that the vehicle is running upon a better road, and the wheel motors are thus over-running the pump, then in consequence of the special arrangement of the pipe connections and valves, no reaction will be produced by the current of liquid upon the pump itself, because in such a case the non-return valve 87 will open the connecting pipe 86, and the wheel motors will then run idle, so that the vehicle can be allowed to "coast" with very little loss through friction. In this case the machine would be running on practically no load and consuming fuel uselessly. This is prevented by the speed governor which, on the machine exceeding the normal rate of revolution exerts by reason of the increased centrifugal force a correspondingly greater pressure upon the piston of cylinder 73 which transmits its movement to the lever 40 and thence to the nut 39. Since the screw 42 is held fast by the pin 45 and the wheels 44 and 47, the said movement of the nut will cause an axial movement of the pin 35 and thus move the regulating cylinders 4', 4, 4' (through the medium of the adjusting mechanism, 31, 30, 29, 28) in such a manner as to increase the delivery and therefore also the resistance of the machine, and thus reduce the speed to the normal limit.

The reverse operation takes place when the machine owing to a greater resistance, for instance when the vehicle is climbing a hill, begins to run slower. In such a case the spring pressure upon the piston in the cylinder 73 transmits the reduced centrifugal pressure in the speed governor, and the supply is diminished.

Since it is always advantageous in a hydraulic gear, to work with the lowest possible working pressure, the apparatus is so arranged that the air supply is reduced as soon as the pressure exceeds a given limit. This result is effected by the piston 83 of the cylinder 85 which is connected through the pipe 85 to the delivery pipe 10 of the pump. As soon as the liquid pressure has overcome the pressure of the spring bearing upon the piston, the said liquid pressure produces a rotation of the nut 39' which (since the screw 42' is fast) moves in an axial direction in such a manner that the slot 55 of the gas supply 54 is partially closed by the piston 53, thereby causing a corresponding diminution in the air supply.

So long as the fuel regulation is not accompanied by a simultaneous automatic regulation of the speed ratio, there is always the possibility that the pressure may rise still farther, especially in cases where the vehicle is driven at the lowest speed, and therefore requires very little air. For this reason the air supply is always influenced by the speed governor. That is, if the speed rises beyond a certain limit, the spring of the piston 78 subjected to the liquid pressure in the machine, is compressed in the cylinder 77 to such a degree that the piston rod 78' will press upon the piston rod 76' of the piston 76. By this means the oil in the cylinder 75 is forced into the speed governor, which latter presses it contained mercury still more intensely against the periphery of the centrifugal wheel 69 and thus increases the centrifugal pressure in the pipe 72 or in the cylinder 73, which produces in the described manner an increase in the delivery of the pump and a reduction of speed.

When it is desired to brake a vehicle fitted with this gear, the regulating wheel 49 is first rotated back to reduce the speed ratio which is finally brought to zero. At the same time the cross-sectional area of flow in the cock 88 is gradually reduced until the flow therethrough is stopped altogether. But since the wheel motors continue to run in consequence of the momentum of the vehicle, liquid continues to be delivered through the pipes 98, 99 and 11', and this liquid is compressed until the pressure exceeds the pressure of the liquid in the vessel 106, when the valve 105 opens. The liquid which the wheel motors continue to deliver will then flow into the vessel 106 and from the latter (when the liquid pressure overcomes the pressure of the spring 109 upon the valve 108 into the vessel 110 whence it flows back to the wheel motors through the return pipe 111, the open valve 112 and the pipes 96, 97, thereby producing a circulation of liquid which tends toward braking.

When it is desired to drive the vehicle backward, the hand wheel 49 is rotated back still farther whereby first the cock 89 is moved into such a position that, as shown in Fig. 14, the direction of the flow of the liquid behind the cock, that is to say, in the pipes 10' and 11' leading to the wheel motors, is reversed. The liquid then flows through the pipe 10 into the cock 89, in the latter through the passage 92 and the cock bore 90 into the "down hole" 95 and thence into the pipe 11' whence it flows in a reversed direction to the wheel motors. From the wheel motors the liquid flows into the pipe 10' and thence into the cock bore 91 and the passage 93 and through the pipe 11 back to the machine. At the same time as the cock is reversed, the air supply is opened again, this having been effected by the piston 53 opening by means of its opposite edge the slit 55.

When the machine is to be stopped altogether, the hand wheel 49 must be moved back into the position of rest, whereupon the initial conditions are restored that is to say, the pipes are closed by the cock 88, and the air or gas supply is closed by the piston 53, while at the same time the ignition of the machine is interrupted.

Having now described my invention what I claim as new and desire to secure by Letters Patent is:—

1. In a hydraulic change speed gear, a rotary machine driven by the engine and comprising piston systems revolving within casings; means for varying the delivery of the rotary machine; connections for driving wheel motors of a power vehicle with an infinitely variable transmission ratio by means of the circulation of working fluid developed by the rotary machine; a suction pipe and a delivery pipe connected to the rotary machine; a reversing cock built into the crossing of said pipes; means for operating the reversing cock whereby the amount and direction of circulation of working fluid behind said cock is controlled; and means for regulating the air supply to the engine, the oil supply and the fuel supply.

2. In a hydraulic change speed gear, a rotary machine driven by the engine and comprising inner casings functioning as slide valves and journaled in outer cylinders inclosing eccentrically journaled piston systems; means for angularly shifting the inner casing relatively to the axis of eccentricity while maintaining the eccentricity constant so as to vary the delivery of the rotary machine; and means for driving wheel motors with an infinitely variable transmission ratio by means of the circulation of working fluid developed by the rotary machine.

3. In a hydraulic change speed gear, a rotary machine driven by the engine, the total internal space of the machine being divided into three spaces of which the volume of the middle space is equal to half the total space; inner casings journaled within these spaces and functioning as slide valves; eccentrically arranged piston systems mounted upon a common driving shaft and journaled within said casings the eccentricity of the piston systems working within the middle casing being exactly opposite to that of both the other two systems whereby the bearings of the driving shaft are relieved of the pressure generated in the rotary machine; means for varying the delivery of the rotary machine and means for driving wheel motors with an infinitely variable transmission ratio by means of the circulation of working fluid developed by the rotary machine.

4. In a hydraulic change speed gear, a rotary machine driven by the engine, the total internal space of the machine being divided into three spaces of which the volume of the middle space is equal to half the total space; inner casings journaled within these spaces and functioning as slide valves; eccentrically arranged piston systems mounted upon a common driving shaft and journaled within said casings the eccentricity of the piston systems working within the middle casing being exactly opposite to that of both the other two systems whereby the bearings of the driving shaft are relieved of the pressure generated in the rotary machine; means for angularly shifting all three inner casings together relative to the axes of eccentricity while maintaining the axes of eccentricity constant so as to vary the delivery of the machine, and means for driving wheel motors of a power vehicle with an infinitely variable transmission ratio by means of the circulation of working fluid developed by the rotary machine.

5. In a hydraulic change speed gear, a rotary machine driven by the engine and comprising piston systems revolving within casings functioning as slide valves, outer casings inclosing the piston casings; tight fitting cover plates in the casings at the ends of the piston systems; spring packing means between the cover plates and the ends of the outer casings; means for varying the delivery of the rotary machine and connections for driving wheel motors with an infinitely variable transmission ratio by means of the circulation of working fluid developed by the rotary machine.

6. In a hydraulic change speed gear, a rotary machine driven by the engine and comprising piston systems revolving within casings functioning as slide valves, outer casings inclosing the piston casings; tight fitting cover plates in the casings at the ends of the piston systems; longitudinally split annular tubes arranged between the cover plates and the ends of the piston systems for the purpose of closing the casings fluid-tight; means for varying the delivery of the rotary machine; and connections for driving wheel motors with an infinitely variable transmission ratio by means of the circulation of working fluid developed by the rotary machine.

7. In a hydraulic change speed gear, a rotary machine driven by the engine and comprising piston systems revolving within casings; means for varying the delivery of the rotary machine; connections for driving wheel motors of a power vehicle with an infinitely variable transmission ratio by means of the circulation of working fluid developed by the rotary machine; a speed regulator controlling rotary fuel and oil pumps; and means whereby the delivery of these latter to the engine is governed by the fluid pressure in the rotary machine.

8. In a hydraulic change speed gear, a rotary machine driven by the engine and comprising piston systems revolving within casings; means for varying the delivery of the rotary machine; connections for driving wheel motors of a power vehicle with an infinitely variable transmission ratio by means of the circulation of working fluid developed by the rotary machine; similar rotary machines for pumping the fuel and oil supply; a speed regulator in the form of a centrifugal pump whose chamber contains two liquids of different specific gravity and is in communication with a cylinder; a spring controlled piston in this cylinder; means for controlling the delivery of the fuel and oil pumps by the movement of said piston.

9. In a hydraulic change speed gear, a rotary machine driven by the engine and comprising piston systems revolving within casings; means for varying the delivery of the rotary machine; connections for driving wheel motors of a power vehicle with an infinitely variable transmission ratio by means of the circulation of working fluid developed by the rotary machine; a speed regulator in the form of a centrifugal pump; a cylinder (75) and piston; a connection between the cylinder (75) and the central part of the centrifugal pump; a piston in a cylinder (77); springs controlling the travel of both pistons; piston rods projecting out of both cylinders in line with and capable of acting upon one another.

10. In a hydraulic change speed gear, a rotary machine driven by the engine and comprising piston systems revolving within casings, and means for varying the delivery of the machine; a suction pipe and a delivery pipe connected to said rotary machine; a speed regulator in the form of a centrifugal pump; a cylinder (73) and a spring controlled piston therefor; a connection between cylinder (73) and the speed regulator; a cylinder (77) and a spring controlled piston therefor, a connection between cylinder (77) and the delivery pipe of the rotary engine; a cylinder (75) and a spring controlled piston therefor arranged in line with the piston of the cylinder (77) so that if the pressure in the delivery pipe rises too high the piston of the cylinder (77) moves the piston of the cylinder (75); a connection between cylinder 75 and the speed regulator so that movement of the piston of the cylinder (75) alters the pressure in the speed regulator and operates the piston in the cylinder (73).

11. In a hydraulic change speed gear, a rotary machine driven by the engine and comprising piston systems revolving within casings and means for varying the delivery of the machine; a suction pipe and a delivery pipe connected to said rotary machine; a speed regulator in the form of a centrifugal pump; a cylinder (73) and a spring controlled piston therefor; a connection between cylinder (73) and the speed regulator; a cylinder (77) and a spring controlled piston therefor, a connection between cylinder (77) and the delivery pipe of the rotary engine; means whereby excessive pressure in the delivery pipe of the rotary machine operates the piston of the cylinder (73); a piston rod and a lever system attached to the piston of the cylinder (73) and controlling the oil and water supply.

12. In a hydraulic change speed gear, a rotary machine driven by the engine and comprising piston systems rotating within inner casings functioning as slide valves; means for rotating said inner casings so as to vary the delivery of the machine; similar machines for pumping the fuel and oil supply; similar means for controlling the delivery of the fuel and oil pumps; and a positive connection between said means whereby the supply of fuel and oil is regulated in accordance with the power requirements of the engine.

13. In a hydraulic change speed gear, a rotary machine driven by the engine and comprising piston systems rotating within inner casings functioning as slide valves; means for rotating said inner casings so as to vary the delivery of the machine; similar machines for pumping the fuel and oil supply; means for driving the fuel and oil machines from the main shaft by gearing; means for controlling the delivery of the fuel and oil pumps; and a lever system positively connecting the means for rotating the inner casings of the rotary machine and the means for varying the delivery of the fuel and oil pumps whereby the supply of fuel and oil is regulated in accordance with the power requirements of the engine.

14. In a hydraulic change speed gear, a rotary machine driven by the engine and comprising piston systems rotating within inner casings functioning as slide valves; means for rotating said inner casings so as to vary the delivery of the machine; similar machines for pumping the fuel and oil supply; similar means for controlling the delivery of the fuel and oil pumps; a lever system positively connecting said means; a rod engaging the lever system; a nut upon the rod; and a worm screw prevented from lineal axial motion engaging the nut, so that rotary movement of the nut, the screw being at rest, or a rotary movement of the screw worm, the nut being prevented from rotary movement, entails an axial movement of the nut and a consequent operation of the controlling means for the main and the auxiliary rotating machines.

15. In a hydraulic change speed gear, a rotating machine driven by the engine and comprising piston systems rotating within inner casings functioning as slide valves; means for rotating said inner casings so as to vary the delivery of the machine; similar machines for pumping the fuel and oil supply; similar means for controlling the delivery of the fuel and oil pumps; a lever system positively connecting said means; a rod engaging the lever system; a nut upon the rod; and a worm screw prevented from lineal axial motion engaging the nut; a lever projecting from the nut; a pin upon said lever; a piston rod engaging said pin; means for operating the piston rod to rotate the nut when the speed of the rotary machine varies so that the speed is governed thereby.

16. In a hydraulic change speed gear, a rotary machine driven by the engine and comprising piston systems rotating within inner casings functioning as slide valves; means for rotating said inner casings so as to vary the delivery of the machine; similar machines for pumping the fuel and oil supply; similar means for controlling the delivery of the fuel and oil pumps; a lever system positively connecting said means; a rod engaging the lever system; a nut upon the rod; and a worm screw prevented from lineal axial motion engaging the nut; a lever projecting from the nut; a pin upon said lever; a piston rod engaging said pin; a spring controlled piston connected to the piston rod; a cylinder for said piston; a speed regulator for the rotary machine in the form of a centrifugal pump; and a connection between said cylinder and said speed regulator whereby the delivery of the rotary machine and simultaneously the delivery of the fuel and oil supply pumps is governed by the speed of the rotary machine.

17. In a hydraulic change speed gear, a rotary machine driven by the engine and comprising piston systems rotating within inner casings functioning as slide valves; means for rotating said inner casings so as to vary the delivery of the machine; similar machines for pumping the fuel and oil supply; similar means for controlling the delivery of the fuel and oil pumps; a lever system positively connecting said means; a rod engaging the lever system; a nut upon the rod; and a worm screw prevented from lineal axial motion engaging the nut; means for rotating said worm screw thereby causing the nut to move axially and operating the lever system to vary the delivery of the main and auxiliary rotary machines.

18. In a hydraulic change speed gear, a rotary machine driven by the engine and comprising piston systems rotating within inner casings functioning as slide valves; means for rotating said inner casings so as to vary the delivery of the machine; similar machines for pumping the fuel and oil supply; similar means for controlling the delivery of the fuel and oil pumps; a lever system positively connecting said means; a rod engaging the lever system; a nut upon the rod; and a worm screw prevented from lineal axial motion engaging the nut; a spindle upon which the worm screw is mounted; a bevel wheel mounted upon the spindle; a bevel wheel mounted upon a shaft and means for directly operating said shaft from the driver's seat for the purpose of varying the delivery of the main and auxiliary rotary machines.

19. In a hydraulic change speed gear, a rotary machine driven by the engine and comprising piston systems rotating within inner casings functioning as slide valves; means for rotating said inner casings so as to vary the delivery of the machine; similar machines for pumping the fuel and oil supply; similar means for controlling the delivery of the fuel and oil pumps; a lever system positively connecting said means; a rod engaging the lever system; a nut upon the rod; and a worm screw prevented from lineal axial motion engaging the nut; a spindle upon which the worm screw is mounted; a bevel wheel mounted upon the spindle; a second worm screw mounted upon the spindle and prevented from axial motion; a second nut upon the second worm screw; so that either a rotary movement of the nut; the screw being prevented from rotating, or a rotary movement of the screw, the nut being prevented from rotating, entails an axial movement of the nut and means for controlling the air supply by the axial movement of the nut.

20. In a hydraulic change speed gear, a rotary machine driven by the engine and comprising piston systems rotating within inner casings and means whereby the delivery of the rotary machine is varied automatically for the purpose set forth; further means for varying the delivery of the rotary machine arbitrarily and for simultaneously varying the air supply to the engine.

21. In a hydraulic change speed gear, a rotary machine driven by the engine and comprising piston systems rotating within inner casings and means whereby the delivery of the rotary machine is varied automatically for the purposes set forth; further means for varying the delivery of the rotary machine arbitrarily; a worm screw mounted upon a spindle and prevented from axial movement, a nut upon said screw connected to a piston; a slotted cylinder for said piston whereby the supply of air to the engine is controlled by the movement of the piston within the slotted cylinder, and means for rotating said screw simultaneously with the arbitrary adjustment of the delivery of the rotary machine.

22. In a hydraulic change speed gear, a rotary machine driven by the engine and comprising piston systems rotating within inner casings; means for varying the delivery of the rotary machine; a suction pipe and a delivery pipe connected to the rotating machine; a cylinder (84) and a spring-controlled piston therefor; a connection between cylinder (84) and the delivery pipe of the rotating machine; and means for regulating the air supply to the engine according to the pressure existing in the delivery pipe.

23. In a hydraulic change speed gear, a rotary machine driven by the engine and comprising piston systems rotating within inner casings; means for varying the delivery of the rotary machine; a suction pipe and a delivery pipe connected to the rotary machine; a cylinder (84) and a spring-controlled piston therefor; a connection between cylinder (84) and the delivery pipe of the rotating machine; a slotted cylinder through which the air or gas is admitted to the engine; a piston (53) working within said cylinder and regulating by its motion the supply of air or gas; a nut fixed to the piston (53); a worm screw upon which the nut is mounted and which is prevented from axial motion; a lever projecting from said nut; a pin upon the lever engaging the piston rod of the piston of the cylinder (84) whereby the air or gas is supplied to the engine according to the pressure existing in the delivery pipe.

24. In a hydraulic change speed gear, a rotary machine driven by the engine and comprising piston systems rotating within inner casings functioning as slide valves; means for rotating said inner casings so as to vary the delivery of the machine; similar machines for pumping the fuel and oil supply; similar means for controlling the delivery of the fuel and oil pumps; a lever system positively connecting said means; and a set screw limiting the motion of the lever system.

25. In a hydraulic change speed gear, a rotary machine driven by the engine and comprising piston systems rotating within inner casings; means for arbitrarily varying the delivery of the machine; connections for driving wheel motors with an infinitely variable transmission ratio by means of the circulation of working fluid developed by the rotary machine; a reversing cock in the circulation system so arranged that the flow of fluid to the wheel motors can be reversed without reversal of the rotary machine; and means whereby said cock is operated simultaneously with the arbitrary variation of the delivery of the rotary machine.

26. In a hydraulic change speed gear, a rotary machine driven by the engine and comprising piston systems rotating within inner casings; means for arbitrarily varying the delivery of the machine; connections for driving wheel motors with an infinitely variable transmission ratio by means of the circulation of working fluid developed by the rotary machine; a reversing cock in the circulation system so arranged that the flow of fluid to the wheel motors can be reversed without reversal of the rotary machine; a high pressure vessel in a pipe branching from the suction pipe beyond the reversing valve; a non-return valve at the inlet to said vessel; a pipe leading from the high pressure vessel to a low pressure vessel and a non-return valve in this pipe; a pipe leading from the low pressure valve to the delivery pipe of the rotary machine and a non-return valve in the pipe, for the purpose set forth.

27. In a hydraulic change speed gear, a rotary machine driven by the engine and comprising piston systems rotating within inner casings; means for arbitrarily varying the delivery of the machine; connections for driving wheel motors with an infinitely variable transmission ratio by means of the circulation of working fluid developed by the rotary machine; a reversing cock in the circulation system so arranged that the flow of fluid to the wheel motors can be reversed without reversal of the rotary machine; a high pressure vessel in a pipe branching from the suction pipe beyond the reversing valve; a non-return valve at the inlet to said vessel; a pipe leading from the high pressure vessel to a low pressure vessel and a non-return valve in this pipe; a pipe leading from the low pressure vessel to the delivery pipe of the rotary machine and a non-return valve in this pipe, for the purpose set forth; a pipe (114) connecting the high pressure vessel with the suction pipe of the main rotary machine; a pipe (115) connecting the delivery pipe of the said rotary machine with the low pressure vessel; and a cock (117) common to and controlling both these pipes whereby a circuit can be established for starting the main machine and the engine.

28. In a hydraulic change speed gear, a rotary machine driven by the engine and comprising piston systems rotating within inner casings; means for arbitrarily varying the delivery of the machine; connections for driving wheel motors with an infinitely variable transmission ratio by means of the circulation of working fluid developed by the rotary machine; a reversing cock in the circulation system so arranged that the flow of fluid to the wheel motors can be reversed without reversal of the rotary machine; a high pressure vessel in a pipe branching from the suction pipe beyond the reversing valve; a non-return valve at the inlet to said vessel; a pipe leading from the high pressure vessel to a low pressure vessel and a non-return valve in this pipe; a pipe leading from the low pressure vessel to the delivery pipe of the rotary machine and a non-return valve in this pipe, for the purpose set forth; a pipe (114) connecting the high pressure vessel with the suction pipe of the main rotary machine; a pipe (115) connecting the delivery pipe of the said rotary machine with the low pressure vessel; and a cock (117) common to and controlling both these pipes whereby a circuit can be established for starting the main machine and the engine; a pipe (118) connecting the low pressure vessel and the high pressure vessel and a non-return valve in this pipe for the purpose of providing a path for an idle circulation as set forth.

29. In a hydraulic change speed gear, a rotary machine driven by the engine and comprising piston systems rotating within inner casings; means for arbitrarily varying the delivery of the machine; connections for driving wheel motors with an infinitely variable transmission ratio by means of the circulation of working fluid developed by the rotary machine; a reversing cock in the circulation system so arranged that the flow of fluid to the wheel motors can be reversed without reversal of the rotary machine; a high pressure vessel in a pipe branching from the suction pipe beyond the reversing valve; a non-return valve at the inlet to said vessel; a pipe leading from the high pressure vessel to a low pressure vessel and a non-return valve in this pipe; a pipe leading from the low pressure vessel to the delivery pipe of the rotary machine and a non-return valve in this pipe, for the purpose set forth; a pipe (114) connecting the high pressure vessel with the suction pipe of the main rotary machine, a pipe (115) connecting the delivery pipe of the said rotary machine with the low pressure vessel; a branch pipe (86) between the suction and delivery pipes of the main rotary machine, a non-return valve in this pipe, and a throttling cock (117) common to and controlling the pipes (114), (115) and (86) for the purpose of closing the branch pipe (86) when a circuit is established for starting the main machine and engine.

30. In a hydraulic change speed gear, a rotary machine driven by the engine and comprising piston systems rotating within inner casings, means for arbitrarily varying the delivery of the machine; connections for driving wheel motors with an infinitely variable transmission ratio by means of the circulation of working fluid developed by the rotary machine; a reversing cock in the circulation system so arranged that the flow of fluid to the wheel motors can be reversed without reversal of the rotary machine; a high pressure vessel in a pipe branching from the suction pipe beyond the reversing valve; a non-return valve at the inlet to said vessel; a pipe leading from the high pressure vessel to a low pressure vessel and a non-return valve in this pipe; a pipe leading from the low pressure vessel to the delivery pipe of the rotary machine and a non-return valve in this pipe, for the purpose set forth; a pipe (114) connecting the high pressure vessel with the suction pipe of the main rotary machine; a pipe (115) connecting the delivery pipe of the said rotary machine with the low pressure vessel; a branch pipe (86) between the suction and delivery pipes of the main rotary machine; a non-return valve in this pipe, and a throttling cock (117) common to and controlling the pipes (114), (115) and (86) for the purpose of closing the branch pipe (86) when a circuit is established for starting the main machine and engine, and means whereby the cock (117) is automatically operated to shut off the starting circuit and simultaneously to open the branch pipes (86) when the pressure in the high pressure vessel falls below a determined value.

In testimony whereof I have signed my name to this specification in the presence of two subscribing witnesses.

LUDWIG HAMMER.

Witnesses:
 WENZEL SINKE,
 AUGUST FUGGER.